(12) United States Patent
Walker

(10) Patent No.: US 10,970,247 B2
(45) Date of Patent: *Apr. 6, 2021

(54) CONDITIONAL OPERATION IN AN INTERNAL PROCESSOR OF A MEMORY DEVICE

(71) Applicant: Micron Technology, Inc., Boise, ID (US)

(72) Inventor: Robert Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/545,907

(22) Filed: Aug. 20, 2019

(65) Prior Publication Data
US 2019/0370221 A1 Dec. 5, 2019

Related U.S. Application Data

(63) Continuation of application No. 15/395,602, filed on Dec. 30, 2016, now Pat. No. 10,394,753, which is a (Continued)

(51) Int. Cl.
*G06F 9/30* (2018.01)
*G06F 15/78* (2006.01)
*G06F 9/38* (2018.01)

(52) U.S. Cl.
CPC ........ *G06F 15/7821* (2013.01); *G06F 9/3001* (2013.01); *G06F 9/30072* (2013.01);
(Continued)

(58) Field of Classification Search
CPC . G06F 15/7821; G06F 9/30072; G06F 9/3877
See application file for complete search history.

(56) References Cited

U.S. PATENT DOCUMENTS 5,528,550 A 6/1996 Pawate et al.
5,991,874 A 11/1999 Mills et al.
(Continued)

FOREIGN PATENT DOCUMENTS

CN 101379481 3/2009
CN 101395578 3/2009

OTHER PUBLICATIONS

Gokhale et al., "Processing in Memory: The Terasys Massively Parallel PIM Array,"; 8153, Computer 28 (Apr. 1995), No. 4, Los Alamitos, CA, US; pp. 23-31.
(Continued)

*Primary Examiner* — Keith E Vicary
(74) *Attorney, Agent, or Firm* — Fletcher Yoder, P.C.

(57) ABSTRACT

An internal processor of a memory device configured to selectively execute instructions in parallel, for example. One such internal processor includes a plurality of arithmetic logic units (ALUs), each connected to conditional masking logic, and each configured to process conditional instructions. A condition instruction may be received by a sequencer of the memory device. Once the condition instruction is received, the sequencer may enable the conditional masking logic of the ALUs. The sequencer may toggle a signal to the conditional masking logic such that the masking logic masks certain instructions if a condition of the condition instruction has been met, and masks other instructions if the condition has not been met. In one embodiment, each ALU in the internal processor may selectively perform instructions in parallel.

20 Claims, 8 Drawing Sheets

Related U.S. Application Data continuation of application No. 12/478,527, filed on Jun. 4, 2009, now Pat. No. 9,535,876.

(52) U.S. Cl.
CPC .......... *G06F 9/3877* (2013.01); *G06F 9/3885* (2013.01); *Y02D 10/00* (2018.01)

(56) References Cited

U.S. PATENT DOCUMENTS

| | | | |
|---|---|---|---|
| 6,842,852 B1 | 1/2005 | Yamasaki et al. | |
| 6,970,988 B1 | 11/2005 | Chung | |
| 8,234,460 B2 | 7/2012 | Walker | |
| 8,380,916 B2 | 2/2013 | Walker | |
| 8,521,958 B2 | 8/2013 | Walker | |
| 8,719,516 B2 | 5/2014 | Walker et al. | |
| 9,477,636 B2 | 10/2016 | Walker et al. | |
| 9,535,876 B2 * | 1/2017 | Walker | G06F 9/30072 |
| 10,394,753 B2 * | 8/2019 | Walker | G06F 15/7821 |
| 2005/0024983 A1 | 2/2005 | Kirsch | |
| 2009/0119437 A1 | 5/2009 | Hilscher | |
| 2010/0312997 A1 | 12/2010 | Walker | |
| 2010/0312998 A1 | 12/2010 | Walker | |

OTHER PUBLICATIONS

Brockman, et al.; Microsavers: A New Memory Semantics for Massively Parallel Computing; Proceedings of the 13th International Conference on Supercomputing; 1999, pp. 454-463.

Rangan, et al.; A Distributed Multiple-SIMD Processor in Memory; Parallel Processing, International Conference on 2001, Sep. 3-7, 2001; Piscataway, NJ, USA, pp. 507-514.

Draper, et al.; The Architecture of the DIVA Processing-In-Memory Chip; Conference Proceedings of the 2002 International Conference on Supercomputing; ICS 02. New York, NY, Jun. 22-26, 2002, 12 pgs.

Draper et al., "A Prototype Processing-In-Memory (PIM) for the Data-Intensive Architecture (DIVA) System," Journal of VLSI Signal Processing, 2005, vol. 40, Springer Science + Business Media, Inc., The Netherlands, pp. 73-84.

Chinese Application No. 201080031093.4 Office Action dated May 4, 2014 and translation, 19 pgs.

European Application No. 10 726 362.6 Article 94(3) EPC dated Nov. 27, 2013, 6 pgs.

Taiwan Application No. 099118246 Office Action dated Feb. 21, 2014 and translation, 12 pgs.

\* cited by examiner

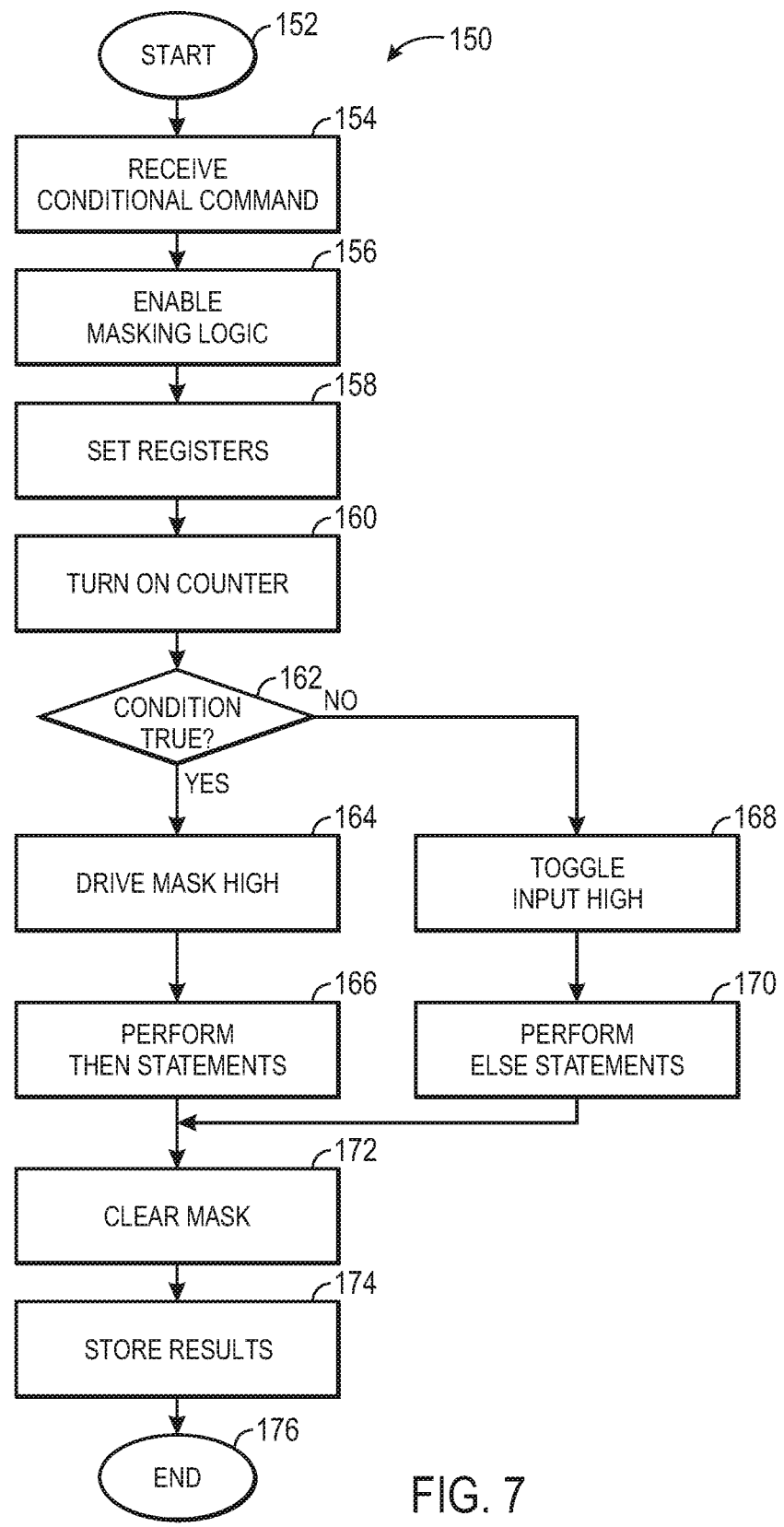

CONDITIONAL OPERATION IN AN INTERNAL PROCESSOR OF A MEMORY DEVICE

CROSS-REFERENCE TO RELATED APPLICATIONS

The present application is a continuation of U.S. application Ser. No. 15/395,602 entitled "Conditional Operation in an Internal Processor of a Memory Device," and filed Dec. 30, 2016, now U.S. Pat. No. 10,394,753 which issued on Aug. 27, 2019, which is a continuation of U.S. application Ser. No. 12/478,527, entitled "Conditional Operation in an Internal Processor of a Memory Device," and filed Jun. 4, 2009, now U.S. Pat. No. 9,535,876 which issued on Jan. 3, 2017, the entirety of which is incorporated by reference herein for all purposes.

BACKGROUND

Field of Invention

Embodiments of the invention relate generally to memory systems, and more particularly, to memory systems having internal processors.

Description of Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light and not as admissions of prior art.

Electronic systems typically include one or more processors, which may retrieve and execute instructions, and output the results of the executed instruction, such as to store the results to a suitable location. A processor generally includes arithmetic logic unit (ALU) circuitry, which is capable of executing instructions such as arithmetic and logic operations on one or more operands. For example, the ALU circuitry may add, subtract, multiply, or divide one operand from another, or may subject one or more operands to logic operations, such as AND, OR, XOR, and NOT logic functions. The various arithmetic and logic operations may have different degrees of complexity. For example, some operations may be performed by inputting the operand(s) through the ALU circuitry in one cycle, while other operations may utilize multiple clock cycles.

A number of components in the electronic system may be involved in directing a set of instructions to the ALU for execution. In some devices, the instructions and any corresponding data (e.g., the operands on which the instructions will be executed) may be generated by a controller, or some other suitable processor in the electronic system. As the time or number of clock cycles required for the execution of a set of instructions may vary depending on the type of operation, the instructions and/or data may be written to a memory device, for example, a memory array, before being executed by the ALU. The instructions and data may be retrieved and sequenced and/or buffered before the ALU begins to execute the instructions on the data.

To improve processing performance, the steps of writing, reading, sequencing, buffering, and executing instructions and/or data may be occurring substantially simultaneously on different instructions, or different parts of an instruction. This parallel processing may be referred to as "pipelining." The performance of the device may also be improved in a processor-in-memory (PIM) device, where the processor (e.g., one or more ALUs) is implemented directly on the memory device, conserving power in processing. Processing may also be performed in parallel, further improving processing performance. In parallel data processing, the execution of operations may be controlled such that certain operations may be selectively performed.

BRIEF DESCRIPTION OF DRAWINGS

Certain embodiments are described in the following detailed description and in reference to the drawings in which:

FIG. 7 depicts a flow chart illustrating a process for conditional execution using a counter-based format, in accordance with one or more embodiments of the present technique.

DETAILED DESCRIPTION

Figure 1:
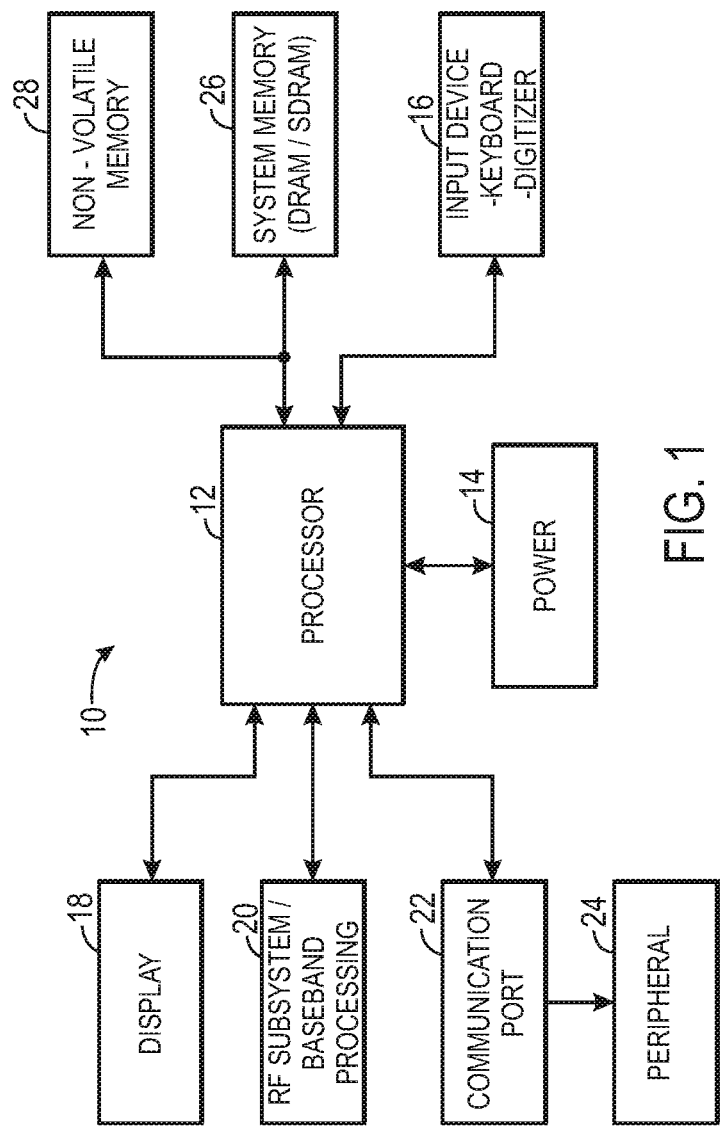
FIG. 1 depicts a block diagram of a processor-based system in accordance with an embodiment of the present technique.

Arithmetic logic unit (ALU) circuitry is generally used to process instructions in multiple stages. Processing the instructions may include executing the instructions, and storing the results of the executed instructions. More specifically, instructions, and the data on which the instructions will be executed, may be sent by a controller to the ALU, and may first be stored in a memory device to be retrieved when the ALU circuitry is available to execute the instructions. Once the instructions have been executed, the ALU may write the results of the operation to a memory component, or to any other suitable output.

In one or more embodiments of the present techniques, one or more processors, such as ALUs, may be packaged with a memory device. For example, the memory device may be a processor-in-memory (PIM), and may include embedded ALUs and a memory array, which may store instructions and data to be executed by the ALUs and the results from the completed instructions. In other embodiments, the ALUs and the memory array may be on unique dies in the same package. For example, the ALUs and the memory array may be arranged in a multi-chip package (MCP), and may be electrically connected by one or more through-silicon vias (TSVs). Processors which are embedded on a memory device, or packaged with a memory component in a memory device, may be referred to as "internal processors," as they are internal to the memory device. As used herein, a "compute engine" may be an example of an internal processor, and may be embedded on or packaged in a memory device in accordance with the present techniques.

While a processor that is external to the memory device may require an external input/output (I/O) to transfer information (e.g., instructions and/or data) to and from the memory array of the memory device, a compute engine may conserve power consumption by allowing information to be transferred between the memory array and the compute engine without an external I/O. The memory device may also include components such as a sequencer to organize the instructions, and a memory component such as a buffer to hold data before the compute engine performs the operations.

As discussed, the compute engine may perform various mathematical and logical operations, and may also be referred to as an internal processor of the memory device. The compute engine may have a number of basic building blocks, which may be ALUs that are each one byte wide. The ALUs of the compute engine may be configured in a way to improve processing performance. One embodiment of the present technique involves a memory device having an embedded compute engine configured for parallel data processing. Parallel data processing in the compute engine may enable one ALU of the compute engine to operate on one operand. While each ALU may take more than one cycle to complete an instruction on an operand, each of the ALUs in the compute engine may process a different operand, allowing the compute engine to process multiple operands in parallel. Thus, in accordance with the present parallel processing techniques, a memory device having an embedded compute engine may process a larger amount of data within the same memory device.

Parallel ALUs may operate on different operands in parallel, and in some systems, the parallel ALUs may be performing the same operations on different operands. However, in one embodiment, conditional instructions may enable the memory device to selectively perform operations on an operand based on whether or not a condition has been met. One or more of the present techniques provide systems and methods of selectively performing operations on a per operand basis, for example, and may improve the efficiency of the compute engine and the quality of processed data, or the results of completed instructions.

Now turning to the figures, FIG. 1 depicts a processor-based system, generally designated by reference numeral 10. As is explained below, the system 10 may include various electronic devices manufactured in accordance with embodiments of the present technique. The system 10 may be any of a variety of types such as a computer, pager, cellular phone, personal organizer, control circuit, etc. In a typical processor-based system, one or more processors 12, such as a microprocessor, control the processing of system functions and requests in the system 10. As is explained below, the processor 12 and other subcomponents of the system 10 may include memory devices manufactured in accordance with one or more embodiments of the present technique.

The system 10 typically includes a power supply 14. For instance, if the system 10 is a portable system, the power supply 14 may advantageously include a fuel cell, a power scavenging device, permanent batteries, replaceable batteries, and/or rechargeable batteries. The power supply 14 may also include an AC adapter, so the system 10 may be plugged into a wall outlet, for instance. The power supply 14 may also include a DC adapter such that the system 10 may be plugged into a vehicle cigarette lighter, for instance.

Various other devices may be coupled to the processor 12 depending on the functions that the system 10 performs. For instance, an input device 16 may be coupled to the processor 12. The input device 16 may include buttons, switches, a keyboard, a light pen, a mouse, a digitizer and stylus, and/or a voice recognition system, for instance. A display 18 may also be coupled to the processor 12. The input device 16 and/or the display 18 may each or both form a user interface. The display 18 may include an LCD, an SED display, a CRT display, a DLP display, a plasma display, an OLED display, LEDs, and/or an audio display, for example. Furthermore, an RF sub-system/baseband processor 20 may also be coupled to the processor 12. The RF sub-system/baseband processor 20 may include an antenna that is coupled to an RF receiver and to an RF transmitter (not shown). One or more communication ports 22 may also be coupled to the processor 12. The communication port 22 may be adapted to be coupled to one or more peripheral devices 24 such as a modem, a printer, a computer, or to a network, such as a local area network, remote area network, intranet, or the Internet, for instance.

The processor 12 generally controls the system 10 by processing software programs stored in the memory. The software programs may include an operating system, database software, drafting software, word processing software, and/or video, photo, or sound editing software, for example. The memory is operably coupled to the processor 12 to store and facilitate execution of instructions to implement various programs. For instance, the processor 12 may be coupled to the system memory 26, which may include dynamic random access memory (DRAM), and/or synchronous dynamic random access memory (SDRAM). The system memory 26 may include volatile memory, non-volatile memory, or a combination thereof. The system memory 26 is typically large so that it can store dynamically loaded applications and data.

The processor 12 may also be coupled to non-volatile memory 28, which is not to suggest that system memory 26 is necessarily volatile. The non-volatile memory 28 may include read-only memory (ROM), such as an EPROM, resistive read-only memory (RROM), and/or flash memory to be used in conjunction with the system memory 26. The size of the ROM is typically selected to be just large enough to store any necessary operating system, application programs, and fixed data. Additionally, the non-volatile memory 28 may include a high capacity memory such as a tape or disk drive memory, such as a hybrid-drive including resistive memory or other types of non-volatile solid-state memory, for instance.

Figure 2:
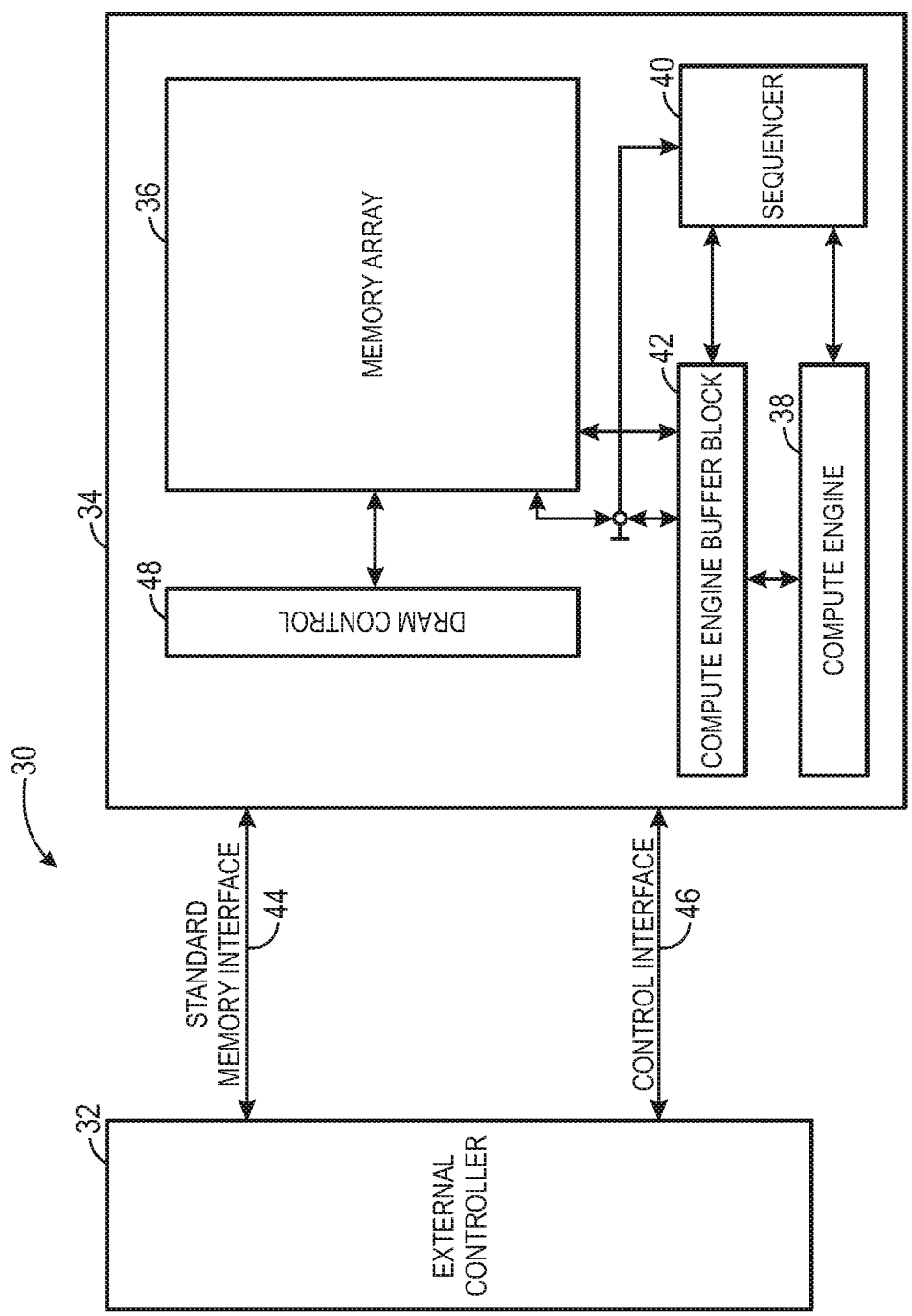
FIG. 2 depicts a block diagram of a memory system with embedded arithmetic logic units interfaced with an external memory controller, in accordance with an embodiment of the present technique.

Some embodiments of the present technique involve communication between the processor 12 and components of the system memory 26. For example, the processor 12 may include a general purpose processor, a central processing unit, a processor core, an ASIC, a memory controller, and/or an ALU, for example, capable of sending signals to and receiving signals from internal processors of memory devices in the system memory 26. Components of the system 10 involved in the communication between the processor 12 and the components of the system memory 26 may be generally referred to as a "memory system" 30, as illustrated in the block diagram of FIG. 2. In some embodiments, a memory system 30 may include a memory device 34, which may be part of the system memory 26 of the system 10 (as in FIG. 1) and may have an internal processor. The memory system 30 may also include an external processor (e.g., external controller 32), which may be in a system-on-a-chip (SOC) with a more general purpose processor to collectively form a processor 12 of a processor-controlled system 10 (as in FIG. 1). The external processor (e.g., external controller 32), which may also be an external memory controller, may communicate with and/or control certain components of a memory device 34.

The memory system 30 may include components which have functions that are not limited to the communication between the external processor (e.g., external controller 32) and the memory device 34. For example, the external processor (e.g., external controller 32) may control devices in addition to the memory device 34. However, the external processor (e.g., external controller 32), as explained with respect to the memory system 30, may refer to one function of the external processor (e.g., external controller 32) which communicates with and/or controls certain components of the memory device 34. Likewise, not all parts of the system memory 26 may be part of the memory system 30. The "memory device" 34 may refer to components of the system memory 26 involved in the communication with the external processor (e.g., external controller 32), in accordance with the present techniques.

The external processor (e.g., external controller 32) and the memory device 34 may be operably coupled by a standard memory interface 44 (e.g., DDR, DDR2, DDR3, LPDDR, or LPDDR2), which may allow data transfer between the external processor (e.g., external controller 32) and the memory device 34, and may allow the external processor (e.g., external controller 32) to send (e.g., transfer) commands to the memory device 34. In one or more embodiments, the types of standard memory interface 44 may include DDR, DDR2, DDR3, LPDDR, or LPDDR2, for example. Further, in some embodiments, an additional interface(s) may be configured to allow the transfer of data, and also commands (e.g., requests, grants, instructions, etc.), between the memory device 34 and the external processor (e.g., external controller 32). For example, the external processor (e.g., external controller 32) and the memory device 34 may also be operably coupled by a control interface 46, which may allow the transfer of commands between the external processor (e.g., external controller 32) and the memory device 34, including commands from the memory device 34 to the external processor (e.g., external controller 32).

The memory device 34 may include a compute engine 38 and a memory array 36. The memory array 36 may refer to any suitable form of storage, and may include, for example, a DRAM array or an SDRAM array. The external controller 32 may have access to the memory array 36, and may be able to write data or instructions to be executed by the compute engine 38. The compute engine 38 may include one or more arithmetic logic units (ALUs).

The compute engine 38 may be embedded on the memory device 34 and capable of accessing the memory array 36, including retrieving information from, and storing information in the memory array 36. The process of retrieving and storing information between the compute engine 38 and the memory array 36 may involve a sequencer 40 and compute engine buffer block 42. The sequencer 40 may sequence the instructions sent by the external controller 32 to the memory array 36 and store the data retrieved from the memory array 36 in a memory component such as the compute engine buffer block 42. Once the compute engine 38 has executed the instructions, the results may be stored in the compute engine buffer block 42 before they are written to the memory array 36. Further, as some instructions may require more than one clock cycle in the compute engine, intermediate results may also be stored in memory components in the memory device 34. For example, intermediate results may be stored in memory components such as the compute engine buffer block 42, other buffers, or registers coupled to the compute engine 38. In some embodiments, the compute engine buffer block 42 may include more than one layer of buffers. For example, the compute engine buffer block 42 may include a compute buffer, which may store operands, and an instruction buffer, which may store instructions. The compute engine buffer block 42 may also include additional buffers, such as a data buffer or a simple buffer, which may provide denser storage, and may store intermediate or final results of executed instructions. As used herein, "buffer 42" may refer to any layer (e.g., a compute buffer, instruction buffer, data buffer, etc.) in the compute engine buffer block 42.

Figure 3:
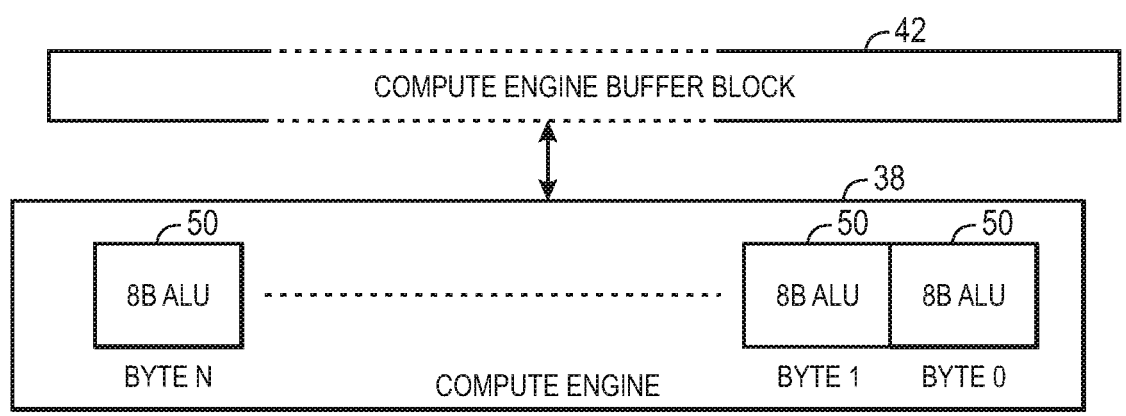
FIG. 3 depicts a block diagram of a compute buffer and a compute engine comprising ALUs embedded on a memory device, in accordance with one or more embodiments of the present technique.
Figure 6:
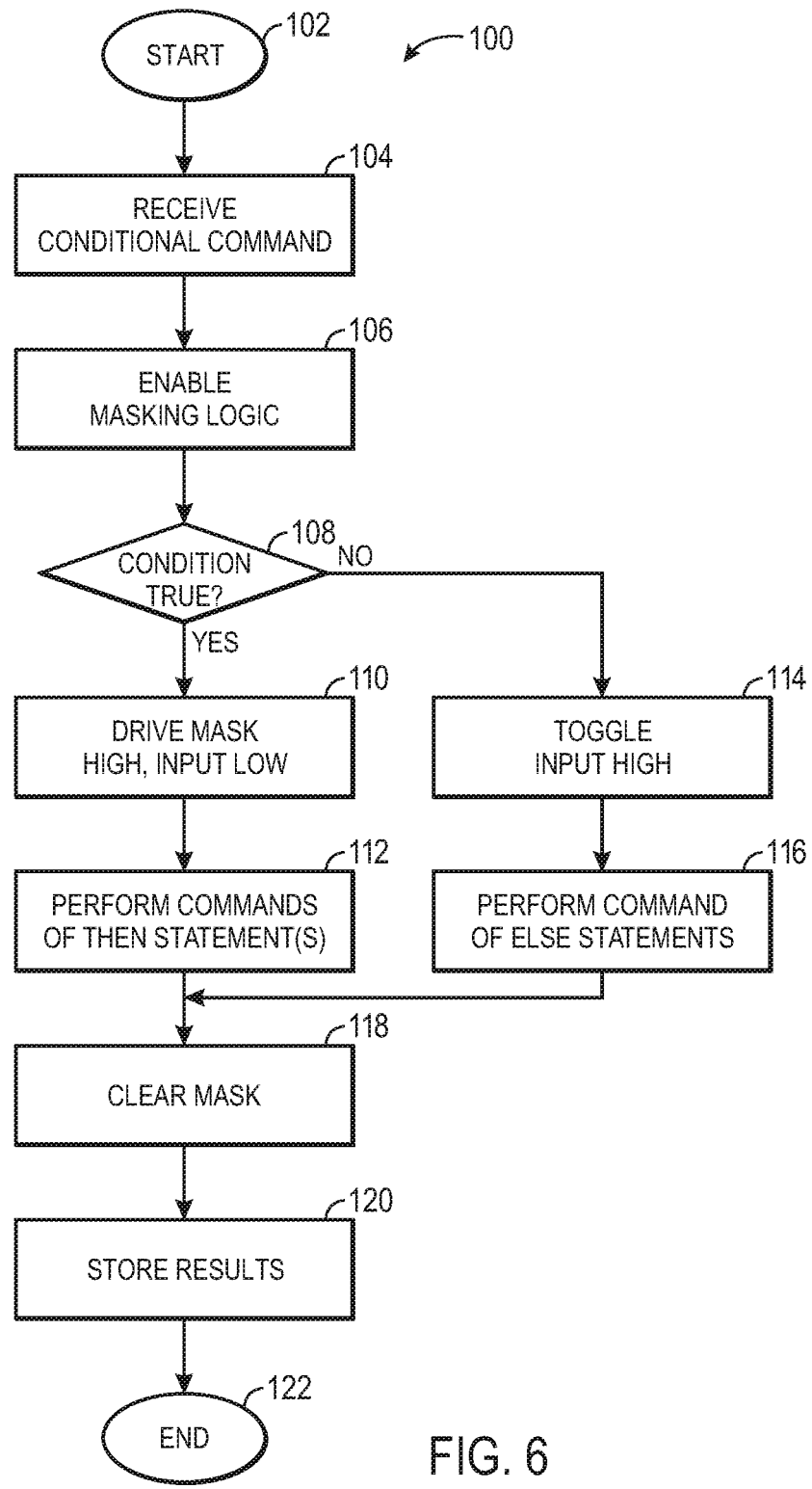
FIG. 6 depicts a flow chart illustrating a process for conditional execution using an inline instruction format, in accordance with one or more embodiments of the present technique.

In a typical memory system 30, an external processor (e.g., external controller 32) may store data and instructions in the memory array 36 on the memory device 34. A sequencer 40 may access the memory array 36 to retrieve the instructions, and may copy the data from the memory array 36 to the buffer 42. The block diagram of FIG. 3 illustrates a compute engine 38 having a plurality of ALUs 50, and may be connected to the buffer 42. In one embodiment, the buffer 42 may be configured such that data may be written to and read from storage elements in the buffer 42 to allow savings in the number of compute cycles of the compute engine 38. Further, the compute engine 38 may be configured such that each ALU 50 may operate on one operand at a time. As will be further discussed with reference to FIG. 6, each ALU 50 in the compute engine 38 may operate on an operand, and multiple operands may be operated on in parallel to increase the efficiency of the compute engine 38.

Figure 4A:
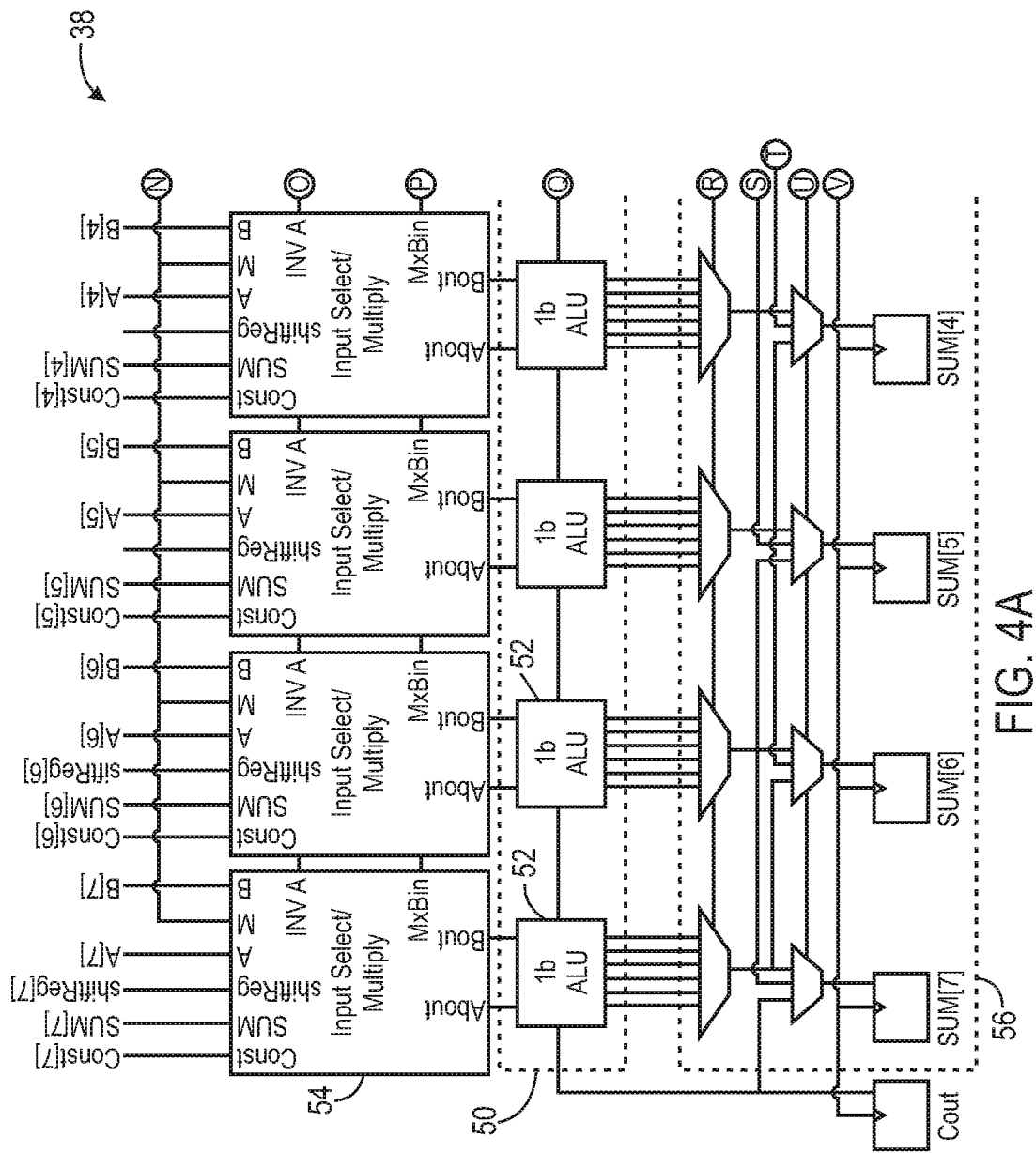
FIGS. 4A and 4B depict a compute engine with an 8 bit ALU, in accordance with one or more embodiments of the present technique.
Figure 4B:
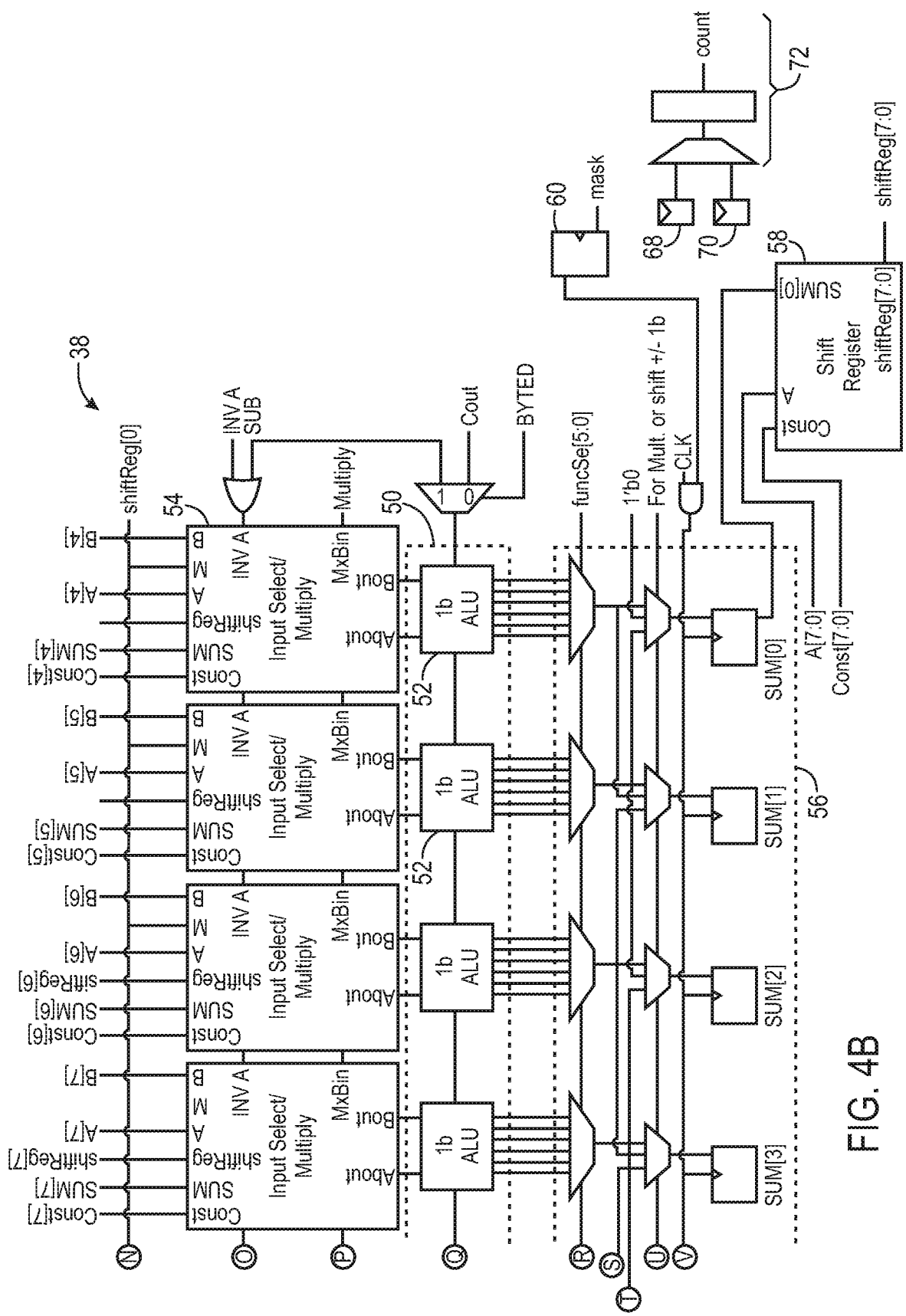

An ALU 50 may operate on any size operand, and depending on the size of the operand, the operation may be performed through one or more cycles through an ALU 50. An ALU 50 may include multiple 1 bit (1 b) ALUs 52, which may be a component of a larger ALU 50. As used herein, the larger ALU 50, comprising one or more 1 b ALUs 52, may be referred to as an "ALU block 50." A portion of a compute engine 38 is illustrated in the diagram of FIGS. 4A and 4B, depicting one embodiment of an ALU block 50 including eight 1 b ALUs 52. The illustration of the 8 b ALU block 50 has been split between FIGS. 4A and 4B, and the lettering (marked N-V) correspond to how each half is joined to form the 8 b ALU block 50. While the present disclosure uses an 8 b ALU block 50 as an example for the present techniques, an ALU block 50 of a different size may also be used. An ALU block 50 in accordance with the present techniques may be composed of building blocks (e.g., adders, 1 b ALUs, etc.) which may enable the ALU block 50 to perform logic or mathematical operations on operands of any size.

An ALU block 50 may operate on operands which may be input by an input multiplexer 54. In some embodiments, the sequencer 40 (FIG. 2) may select the data to be written to each 1 b ALU 52, from five different inputs of the input mux 54, including constant register (labeled "const [0-7]"), sum register ("SUM [0-7]"), shift register ("shiftReg [0-7]"), array A ("A [0-7]"), and array B ("B [0-7]"). The arrays A and B may be input from different parts of the memory array 36. In some embodiments, the memory array may include banks A and B, which may be connected to one another, configured around the compute engine buffer block 42, or otherwise configured on the memory device 34.

For some operations, operands may cycle through one or more 1 b ALUs 52 more than once, and the outputs of one cycle through a 1 b ALU 52, which can be an intermediate result, may be carried in as an input for another 1 b ALU 52 in the ALU block 50. Operations may be completed in one or more cycles depending on the size of the operand to be operated on, the type of the operation, and the size of the ALU block 50. For multi-cycle operations, the constant register may be input into one 1 b ALU 52 from one cycle through another 1 b ALU 52, for example, a summing operation from another 1 b ALU 52. Further, intermediate results of operations may also be input to the input mux 54 through the sum register and shift register inputs. For example, in one embodiment, intermediate results may be output from the 1 b ALUs 52 and stored in the sum register or the shift register 58 until they are input back into the input mux 54. The shift register input for each 1 b ALU 52 may be carried in from a carry-out output of another 1 b ALU 52 in the ALU block 50. The intermediate results carried into each shift register input may be shifted from one 1 b ALU 52 to another 1 b ALU 52 by a shift unit 56 connected to each 1 b ALU 52. By shifting the results of each cycle to an adjacent 1 b ALU 52 in the ALU block 50, one ALU block 50 may operate on one operand through one or more cycles.

As each ALU block 50 may be configured to operate on one operand, the ALU blocks 50 of the compute buffer may process operands in parallel by each performing the same operations on a different operand. In one embodiment, processing performance may be further improved by enabling each ALU to perform operations based on whether a condition(s) has been met. For example, an ALU may be capable of receiving a condition instruction, and performing certain conditional operations, such as executing certain conditional instructions in a stream of instructions, based on whether the condition of the condition instruction has been met. In some embodiments, it may be desirable for a compute engine 38 to perform an operation on certain operands if a condition has been met, or to perform a different operation on different operands if the condition has not been met. While the final results may be achieved by performing operations regardless of whether the condition has been met, some operations may be irrelevant, and may take up buffer or memory space and slow the processing of the compute engine 38.

Enabling a method of selectively performing operations based on a condition(s) may improve processing performance and the quality of the final or intermediate results. For example, a compute engine 38 may have 256 ALU blocks 50. The compute engine 38 may receive an instruction to be executed where an operation to be performed depends on whether operand A is greater than operand B, e.g., "if (A>B) then B+5; else B−5." If the operands were one byte wide, then each of the 256 ALU blocks 50 may compare whether A>B. As each of the 256 ALU blocks 50 may have different operands A and B, each of the ALU blocks 50 may perform either B+5 or B−5 to produce different results across the 256 operations. Thus, each ALU block 50 may perform operations based on such an instruction.

Figure 5:
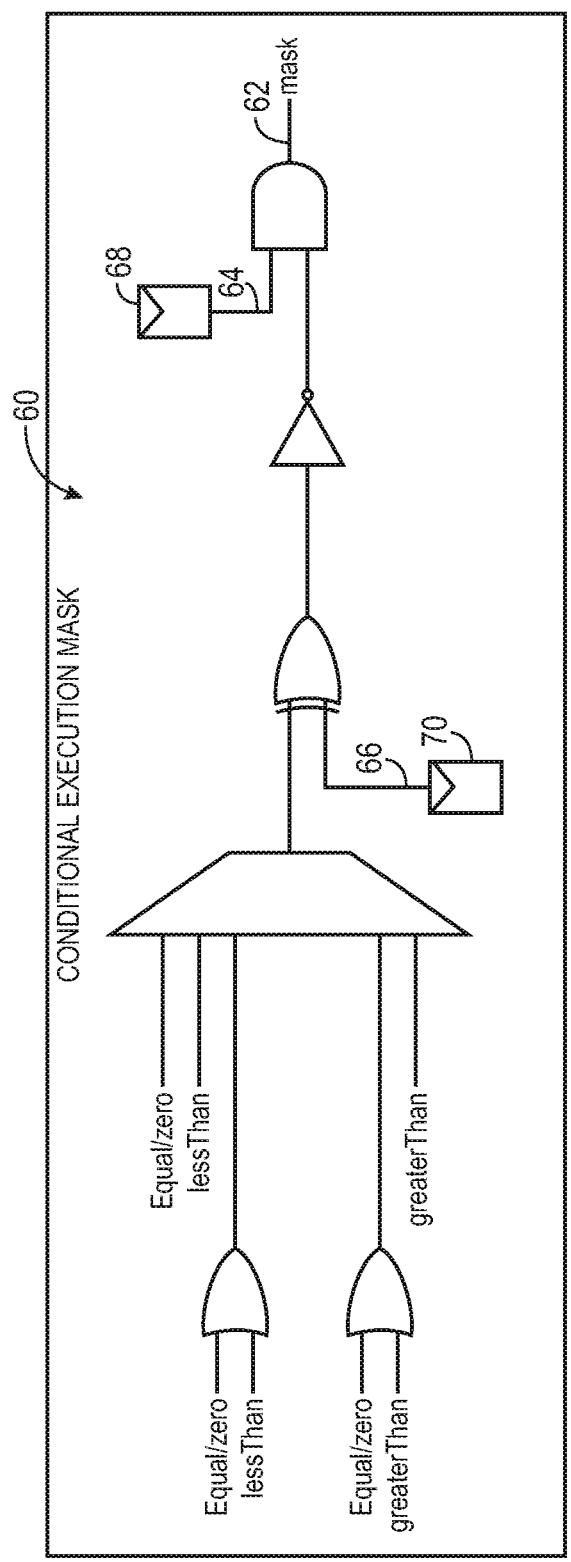
FIG. 5 illustrates logic used for conditional masking, in accordance with one or more embodiments of the present technique.

In one embodiment, the compute engine 38 may selectively control which operations to perform by enabling masking logic such that toggling an input may mask a conditional operation, such as a "then" operation or an "else" operation. For example, if a condition has been met, the else operations may be masked, and the then operations may be performed. If a condition has not been met, the then operations may be masked, and the else operations may be performed. Referring back to the portion of the compute engine 38 of FIGS. 4A and 4B, each ALU block 50 may be connected to conditional masking logic 60. One embodiment of the conditional masking logic 60 may be seen in more detail in FIG. 5. The conditional masking logic 60 may be referred to as a conditional masking unit or a circuit that masks certain operations in a stream of instructions based on whether a condition is met. The mask of the conditional masking logic 60 may be controlled by a sequencer 40 (FIG. 2), which may enable the conditional masking logic 60, and toggle the input 66. When the conditional masking logic 60 is enabled, the output 62 of the logic 60 may mask a then operation or an else operation, for example, based on how the input 66 has been toggled.

The conditional masking logic 60 may be implemented in various ways. One method of selectively performing operations, may be an inline process 100, as depicted in the flow chart of FIG. 6. The inline process 100 may involve instructions which have a bit field(s) indicating whether the instruction is a condition instruction or is a conditional instruction (i.e., the execution of the instruction is based on whether a condition has been met or not). An explanation of the inline process 100 may refer to components in the memory system 30 of FIG. 2, and also to the conditional masking logic 60 of FIG. 5. Furthermore, the explanation may also refer to an example of an inline stream of instructions used in the inline process 100, as provided below:

1. lessThan, 2, 3, 1, 0, 0
2. add, 2, 4, 0, 1, 0
3. and, 3, 4, 0, 1, 0
4. multiply, SUM, 2, 0, 1, 0
5. sub, 2, 4, 0, 0, 1
6. and, 3, 4, 0, 0, 1
7. multiply, SUM, 4, 0, 0, 1
8. or, SUM, 4, 0, 0, 1
9. and, 1, 5, 0, 0, 0

The inline process 100 may start (block 102) when the sequencer 40 receives an instruction (block 104). In the example above, each instruction may include an operation, an address of operand A, an address of operand B, and an indication of whether it is a condition instruction or a conditional instruction. The provided stream of instructions is one example of how a stream of condition or conditional instructions may be configured. In other embodiments, the configuration of each instruction could be different. For example, instructions that are not conditional may only have bit fields defining the operand A and operand B addresses, and the then and else qualifiers, and may not have a conditional qualifier.

In the example stream provided, instruction 1 may be a condition instruction, as it includes an indication that it is a condition instruction—e.g., in this case, a bit field such as a condition field is "1,", and the operation may be to determine whether row 2 of the buffer 42 (operand A) is less than row 3 of buffer 42 (operand B). Further, in the example provided, instruction 4 may include an operation to multiply the data found in the sum register of the ALU block 50 (operand A) by row 2 of the buffer 42 (operand B). As previously discussed, the sum register may hold intermediate results of a previous cycle in the ALU block 50. Typically, multiplication may be a multi-cycle operation, and may use intermediate results from the sum register of the ALU block 50. As instruction 4 is not a condition instruction, the condition field may be "0." Instruction 4, however includes an indication that it is a conditional instruction—in this case the then field is set to "1" (while the else field is set to "0").

The instructions may be sent to the memory device 34 by a processor external to the memory device 34, for example, the external controller 32. Once the sequencer 40 receives a condition instruction, the sequencer may enable the conditional masking logic (block 106) by setting an enable signal 64 to "1." The sequencer 40 may also set the input 66 to "0." The input 66 may be toggled based on whether the condition of an instruction has been met, and either then operations or else operations may be performed. The sequencer 40 may then determine whether the condition in the conditional command has been met (block 108). For example, the sequencer 40 may keep the input 66 at "0" if a certain condition has been met, and an ALU block 50 may perform certain operations in response to the "0" state of the input 66. The sequencer may also toggle the input 66 to be "1" if a certain condition has not been met, and the ALU block 50 may perform other operations in response to the "1" state of the input 66.

Referring again to the example of an inline stream of instructions, if the sequencer 40 determines that row 2 of the compute buffer 42 is less than row 3 of the compute buffer 42, then sequencer 40 may drive the output 62 of the conditional masking logic 60 high, such as by keeping input 66 low (block 110). Because the output 62 of the logic 60 is driven high, the ALU block 50 may perform the then instructions (block 112), which are the instructions in lines 2-4 above. For example, the ALU block 50 may add rows 2 (operand A) and 4 (operand B) of the compute buffer 42.

If the sequencer 40 determines that row 2 is greater than row 3 of the compute buffer 42, then the condition of the first instruction may not be met, and the sequencer 40 may toggle the input 66 high (block 114). Because the input 66 has been toggled, the ALU block 50 may perform the else statements (block 116), which in this example are instructions in lines 5-8. For example, the ALU block 50 may subtract row 4 (operand B) from row 2 (operand A) of the compute buffer 42.

Once the ALU block 50 has executed all the then instructions, or all the else instructions (depending on whether the condition has been met), the sequencer may clear the masks (block 118). As seen in the example, the sequencer 40 can do this by generating a clearing instruction, such as that shown on line 9, where bit fields that might otherwise be used to indicate that such an instruction is a condition instruction or a conditional instruction are all set to "0." The instruction field and the bit fields for the operand addresses may be arbitrary. Clearing the masks may enable the sequencer 40 to start the process 100 again for all the ALU blocks 50 when another condition instruction is received. The inline instruction process 100 may end (block 122) after results from the completed instructions are stored (block 120). For example, results may be stored in the compute buffer 42, or may be stored directly in a memory array 36 of the memory device 34.

One advantage of the inline process 100 is that an infinite number of conditional instructions may be sent in an inline stream of instructions. The instructions may be limited only by the number of relevant instructions for each condition. Embodiments of the present techniques also include other conditional instruction formats. For example, in another embodiment, a stream of instructions may include an instruction having bit fields to indicate which of the instructions following the condition instruction are conditional instructions to be executed if the condition is met, and which are conditional instructions to be executed if the condition is not met. An example of this embodiment is illustrated in the flow chart of a counter process 150 in FIG. 7. An explanation of the counter process 150 may refer to components in the memory system 30 of FIG. 2, and also to the conditional masking logic 60 of FIG. 5. Furthermore, the explanation may also refer to the following stream of instructions:

1. lessThan, 1, 3, 2, 1, 2
2. add, 0, 0, 0, 1, 2
3. sub, 0, 0, 0, 3, 1
4. and, 0, 0, 0, 7, 1
5. add, 0, 0, 0, 2, 4
6. sub, 0, 0, 0, 1, 7
7. and, 0, 0, 0, 4, 2

The instructions in such a stream may include an operation, an indication of whether the instruction is a condition instruction, a count(s) for a conditional instruction(s), an address of operand A, and an address of operand B. As previously discussed, the provided stream of instructions is one example of how a stream of instructions may be configured. In other embodiments, the configuration of each instruction could be different. For example, only the condition instruction (line 1) may have bit fields defining the instruction as a condition and defining the then and else operations in the instruction stream. The other commands may include only the addresses for the operands A and B.

In the provided example, instruction 1 may be a conditional, as the condition field is "1," and the condition is whether row 1 of the buffer 42 (operand A) is less than row 2 of buffer 42 (operand B). A count for then instructions may be set to 3, and the ALU block 50 may execute the three instructions as then instructions (e.g., perform the next three instructions if the condition is met). The count for else instructions may be set to 2, and the ALU block 50 may perform the fourth and fifth instructions following the condition instruction as else instructions (e.g., perform the fourth and fifth operations if the condition has not been met).

The counter process 150 may start (block 152) when the sequencer 40 receives a condition instruction (block 154). The condition instruction may be sent from a processor external to the memory device 34, such as the external controller 32. In response to receiving the condition instruction, the sequencer 40 may enable the conditional masking logic (block 156) by setting the conditional masking logic enable signal 64 to "1." The sequencer 40 may also set the input 66 to "0." The input 66 may be toggled based on whether the condition in the condition instruction has been met, and certain conditional instructions may be executed.

The sequencer 40 may recognize that the instruction in the stream has bit fields indicating a number of then instructions and a number of else instructions in the command stream. To execute the correct instructions, the sequencer 40 may track the number of the then and else instructions in registers (block 158). For example, in one embodiment, the sequencer 40 may set a conditional register 68 to track the conditional instructions in the stream and a then/else register 70 to track the number of then instructions or else instructions in the stream. The sequencer 40 may also turn on a counter 72 (block 160) in the conditional masking logic 60 to count the numbers which are stored in the registers 68 and 70.

The sequencer 40 may then determine whether the condition has been met (block 162). Referring to the example of the example stream of instructions previously shown above, the sequencer 40 may determine that row 1 (operand A) is less than row 2 (operand B). The sequencer 40 may then cause the output of the conditional masking logic 60 to be high (block 164), such as by keeping the input 66 low. The ALU block 50 may then execute the then instructions in the stream (block 166), while the else instructions are masked. Since the bit field indicating the then instructions count is 3, the ALU block 50 may execute the first three instructions after the condition instruction. For example, the ALU block 50 may add row 1 of the compute buffer 42 (operand A) to row 2 of the compute buffer 42 (operand B). If the sequencer 40 determines that row 1 is not less than row 2, the sequencer 40 may toggle the input 66 to high (block 168), and the conditional masking logic 60 may mask the then instructions such that the ALU block 50 skips the then instructions (the first three instructions following the condition instruction, since the count on the "then" field was set to three) to perform the two else instructions (block 170) after the three then instructions. For example, the ALU block 50 may add row 2 of the compute buffer 42 (operand A) to row 4 of the compute buffer 42 (operand B).

Once the ALU block 50 has performed all the then operations, or all the else operations (depending on whether the condition has been met), the sequencer 40 may clear the masks for all the ALU blocks 50 of the compute buffer 42 (block 172). As seen in the example, instruction 7 may clear the masks in the same manner as the clearing instruction discussed with the previous example. The counter process 150 may end (block 176) after results from the completed operations are stored in, for example, a buffer 42 or a memory array 36 (block 174).

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An apparatus, comprising:
   a memory device, comprising:
   a sequencer configured to receive an instruction, selectively generate a first signal, and selectively generate a second signal having a value indicating whether a condition of the instruction has been met; and
   an internal processor coupled to the sequencer, wherein the internal processor comprises:
   a conditional masking logic configured to generate an output based upon the first signal and the second signal; and
   a plurality of arithmetic logic unit (ALU) blocks that operate in parallel, wherein each ALU block of the plurality of ALU blocks when in operation selectively executes operations based on the output of the conditional masking logic.

2. The apparatus of claim 1, comprising an external processor coupled to the memory device.

3. The apparatus of claim 2, comprising a memory interface coupling the external processor to the memory device to facilitate data transmission therebetween.

4. The apparatus of claim 2, comprising a control interface coupling the external processor to the memory device to facilitate transmission of commands to the memory device.

5. The apparatus of claim 2, wherein the sequencer when in operation sequences the instruction and a second instruction sent by the external processor.

6. The apparatus of claim 2, wherein the external processor when in operation transmits the instruction to the memory device.

7. The apparatus of claim 6, wherein the memory device comprises a buffer that when in operation stores the instruction.

8. The apparatus of claim 6, wherein the memory device comprises a memory array that when in operation stores the instruction.

9. The apparatus of claim 1, wherein the sequencer is configured to clear masks of each ALU block of the plurality of ALU blocks.

10. The apparatus of claim 1, wherein the memory device comprises a buffer that when in operation stores results generated by the plurality of ALU blocks.

11. The apparatus of claim 1, wherein the memory device comprises a memory array that when in operation stores results generated by the plurality of ALU blocks.

12. A system, comprising:
    an external processor configured to transmit a condition instruction; and
    a memory device coupled to the external processor to receive the condition instruct ion, wherein the memory device comprises:
    a buffer that when in operation stores the condition instruction;
    a sequencer coupled to the buffer, wherein the sequencer is configured to receive the condition instruction, selectively generate a first signal, and selectively generate a second signal having a value indicating whether a condition of the condition instruction has been met; and
    an internal processor coupled to the sequencer, wherein the internal processor comprises a plurality of arithmetic logic unit (ALU) blocks configured to operate in parallel, wherein each ALU block of the plurality of ALU blocks when in operation selectively executes operations based on an output of a conditional masking logic, wherein the sequencer controls the output of the conditional masking logic via the first signal and second signal.

13. The system of claim 12, wherein the sequencer when in operation sequences the instruction and a second instruction sent by the external processor.

14. The system of claim 12, wherein the sequencer is configured to clear masks of each ALU block of the plurality of ALU blocks.

15. The system of claim 12, wherein the buffer when in operation stores results generated by the plurality of ALU blocks.

16. The system of claim 12, wherein the memory device comprises a memory array that when in operation stores results generated by the plurality of ALU blocks.

17. A system, comprising:
    an external processor configured to transmit a condition instruction; and
    a memory device coupled to the external processor to receive the condition instruction, wherein the memory device comprises:
    a memory array that when in operation stores the condition instruction;
    a sequencer coupled to the memory array, wherein the sequencer is configured to receive the condition instruction, selectively generate a first signal, and selectively generate a second signal having a value indicating whether a condition of the condition instruction has been met; and
    an internal processor coupled to the sequencer, wherein the internal processor comprises a plurality of arithmetic logic unit (ALU) blocks configured to operate in parallel, wherein each ALU block of the plurality of ALU blocks when in operation selectively executes operations based on an output of a conditional masking logic, wherein the sequencer controls the output of the conditional masking logic via the first signal and second signal.

18. The system of claim 17, wherein the sequencer is configured to clear masks of each ALU block of the plurality of ALU blocks.

19. The system of claim 17, wherein the memory device comprises a buffer that when in operation stores results generated by the plurality of ALU blocks.

20. The system of claim 19, wherein the memory array when in operation receives the results generated by the plurality of ALU blocks from the buffer.

* * * * *